United States Patent [19]

Herring

[11] Patent Number: 4,688,824
[45] Date of Patent: Aug. 25, 1987

[54] SAFETY DEVICE FOR VEHICLES

[76] Inventor: John D. Herring, 150 Highland St., P.O. Box 1945, Cotuit, Mass. 02635

[21] Appl. No.: 836,108

[22] Filed: Mar. 4, 1986

[51] Int. Cl.⁴ ............................................. B60R 13/04
[52] U.S. Cl. ................................. 280/762; 280/768; 293/118
[58] Field of Search ............... 280/762, 768; 180/274, 180/279; 293/118, 42, 128, 15; 105/1.2, 452

[56] References Cited

U.S. PATENT DOCUMENTS

| 564,027 | 4/1896 | Pratt | 293/128 |
|---|---|---|---|
| 824541 | 4/1906 | Hager et al. | 293/118 |
| 1,127,241 | 10/1915 | Eisenhauer | 180/279 |
| 1127241 | 10/1913 | Hawksworth | 293/128 |
| 1,252,558 | 10/1917 | Edrington | 293/118 |
| 1,511,085 | 6/1924 | McItyre | 293/128 |
| 3,570,225 | 3/1971 | Miskiewicz | 180/279 |
| 3,618,998 | 11/1971 | Swauger | 280/762 |
| 3,992,042 | 11/1976 | Helmick | 280/762 |
| 42,495,801 | 6/1982 | Henthorne | 293/42 |
| 4,514,002 | 4/1985 | McIntosh | 293/118 |

FOREIGN PATENT DOCUMENTS 2823951 12/1979 Fed. Rep. of Germany .
28324 of 1902 United Kingdom .
2011 of 1912 United Kingdom .
330889 6/1930 United Kingdom .
2142595 1/1985 United Kingdom .

OTHER PUBLICATIONS

"Safty Grill Designed for School Buses", Jan. 1984, Trailer Build Magazine.

Primary Examiner—John J. Love
Assistant Examiner—Mitchell J. Hill
Attorney, Agent, or Firm—Blodgett & Blodgett

[57] ABSTRACT

A guard for a school bus which consists of a sheet of flexible material which can be extended into an open planar state and which can be reduced into a compact folded state. A connector is connected to one edge of the sheet and is pivotally connected to a fixed portion of the school bus for movement between a first position in which it is effective to extend the sheet of flexible material and to a second position in which it is effective to cause the sheet of flexible material to be reduced to a its compact state. A selectively actuated driving mechanism moves the connector selectively between to the first and second positions.

6 Claims, 11 Drawing Figures

SAFETY DEVICE FOR VEHICLES

BACKGROUND OF THE INVENTION

The present invention is directed to a safety device for vehicles in general and for school buses in particular.

Throughout the United States, many laws have been passed concerning safety measures for school buses and safety measures concerning school buses in relation to traffic. The school bus is painted a distinctive color, it includes a sign or signs which say "school bus" and it is provided with lights which flash when the bus is stopped to take on or discharge passengers. All of these features serve as warning signals to other drivers to be careful of children in the area who may be running to or from the bus. From time-to-time, buses have been provided with other safety features in an effort to cut down on the high number of injuries involving school buses. Despite all of the safety measures which have been adopted, many school bus related injuries continue to occur throughout the nation. The most serious of these injuries are a result of students being run over by the bus as the bus approaches or departs from a bus stop. These injuries occur when the student falls or slips in front of one of the wheels of the bus as it is arriving at or leaving from the school bus stop. Because of the weight of the school bus, a student who is run over by the wheels of the bus is either killed or severely maimed.

In the past, guards have been applied to motor vehicles including buses. The guards of the prior art are either permanent structures or structures which are designed to remain in an active position during operation of the motor vehicle. The later guards comprise complex structures which can be either removed from the motor vehicle or moved to an inactive position when the motor vehicle is not in operation, for example, when it is necessary to repair the motor vehicle. In each case, the step of changing the guard from the active position to the inactive position or vice versa, requires manipulation of mechanical elements while the motor vehicle is stopped. In order for the guard to be effective, it must be in the active position when the motor vehicle is in use. The presence of a guard or guard system makes the motor vehicle unattractive. Since the guard must, by necessity, be close to the road surface, it is subject to damage. Because of the many problems which are associated with these guards for motor vehicles, guards have never been accepted by the public. The difficulties experienced with the prior art guards for vehicles have been obviated by the present invention.

It is, therefore, the principle object of the invention to provide a guard for a school bus which can be selectively activated during operation of the bus.

Another object of this invention is the provision of a guard for a school bus which is mounted on the bus so that it can be selectively moved between an active position and an inactive position and the movement of the guard is subject to automatic control and manual control by the operator of the bus.

It is another object of the present invention to provide a guard for a school bus which can be selectively activated while the bus is moving or while it is stationary.

A still further object of the invention is the provision of a guard for a school bus which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

The invention consists of a guard for a school bus comprising a sheet of flexible material having one end which is attached to the bottom edge of the school bus body, connecting means having one end which is connected to the opposite edge of the sheet of flexible material and an opposite end which is pivotally connected to a fixed structure on the bus. The guard includes drive means for selectively moving the connecting means so that the sheet of flexible material can be moved from a compact inactive state near the bottom edge of the school bus body to an active state in which the sheet of flexible material is fully extended between the bottom edge of the school bus body to a point near the road surface.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
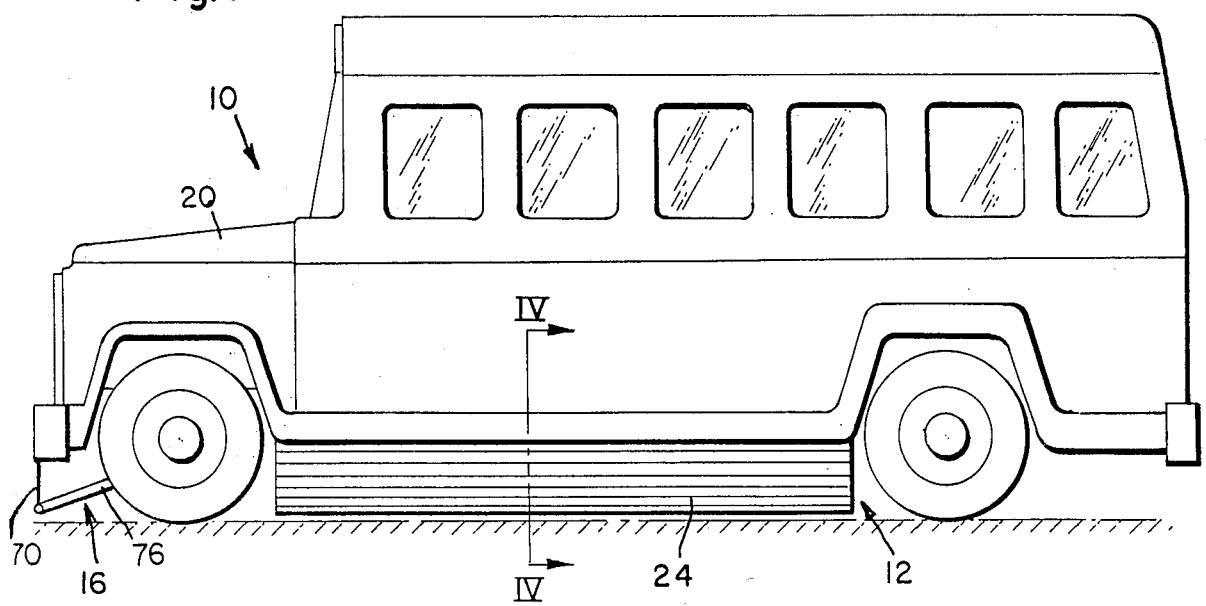
FIG 1 is an elevational view of the left side of a school bus which is equipped with a guard embodying the principles of the present invention.
Figure 2:
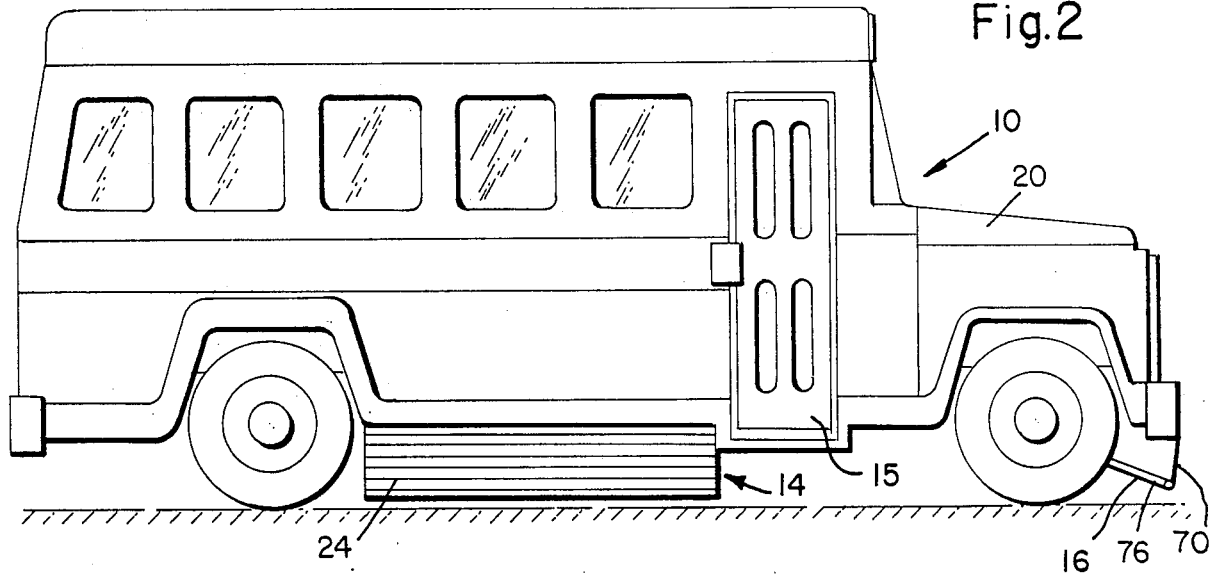
FIG. 2 is an elevational view of the right side of the bus and showing a guard which is adapted to the right side of the bus.
Figure 3:
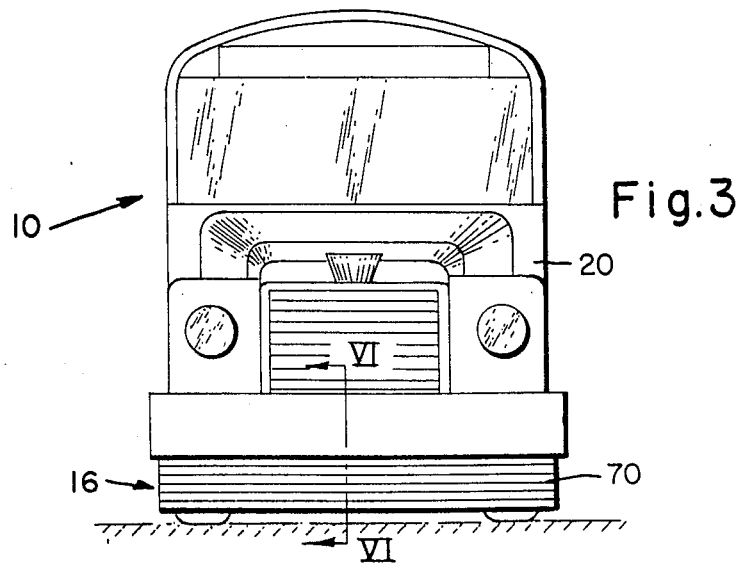
FIG. 3 is a front elevational view of the bus as showing a guard which is adapted to the front of the bus.

Referring first to FIGS. 1-3, there is shown a school bus which is generally indicated by the reference numeral 10 which is equipped with a plurality of guards embodying the principles of the present invention. The left hand side of the bus is provided with a guard which is generally indicated by the reference numeral 12, see FIG. 1. The right hand side of the bus is provided with a guard which is generally indicated by the reference numeral 14, see FIG. 2. The front of the bus is provided with a guard which is generally indicated by the reference numeral 16, see FIGS. 1–3.

Figure 4:
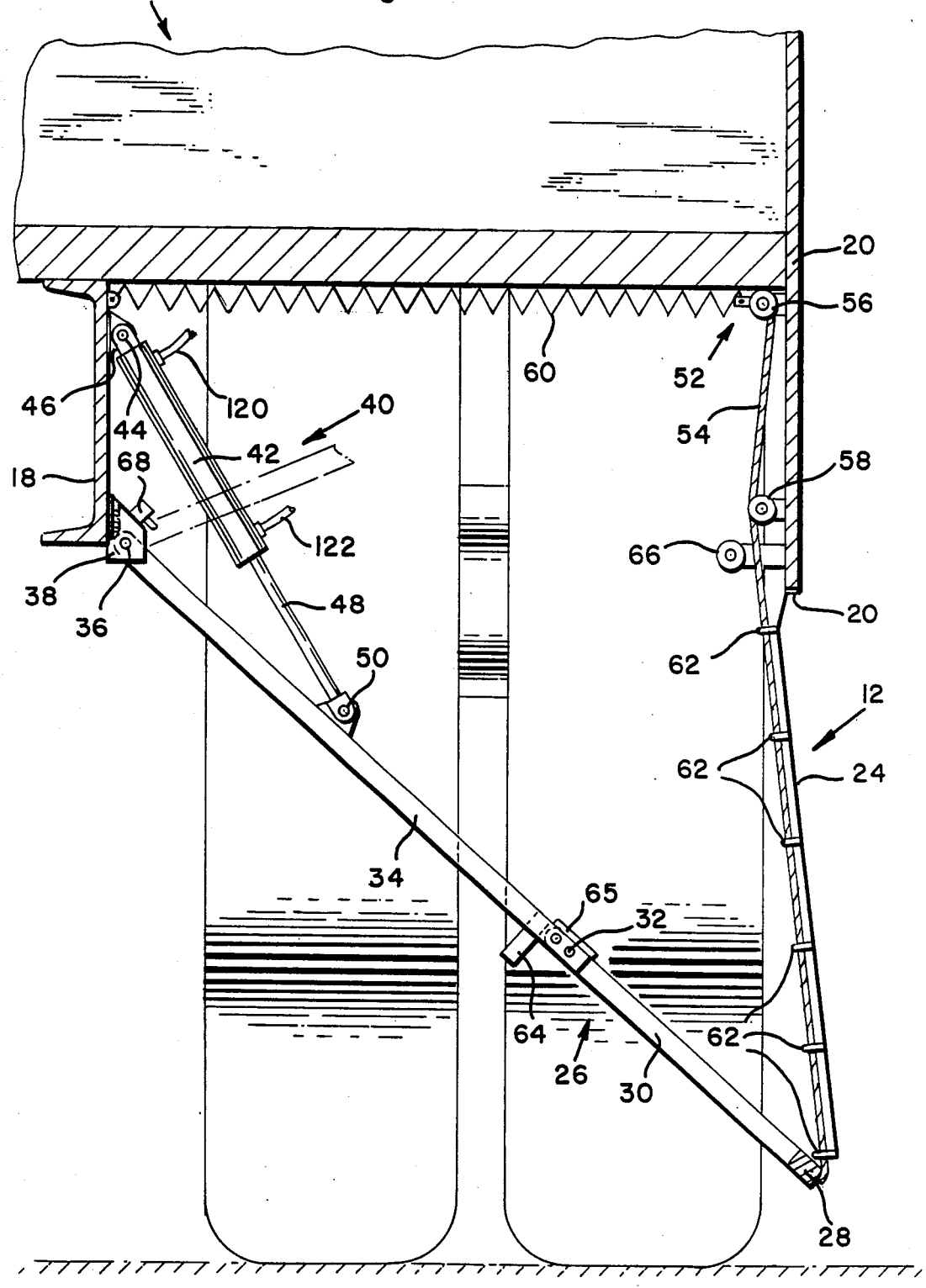
FIG. 4 is a vertical cross-sectional view taken on the line IV—IV of FIG. 1, showing the guard in a fully extended or active position.
Figure 5:
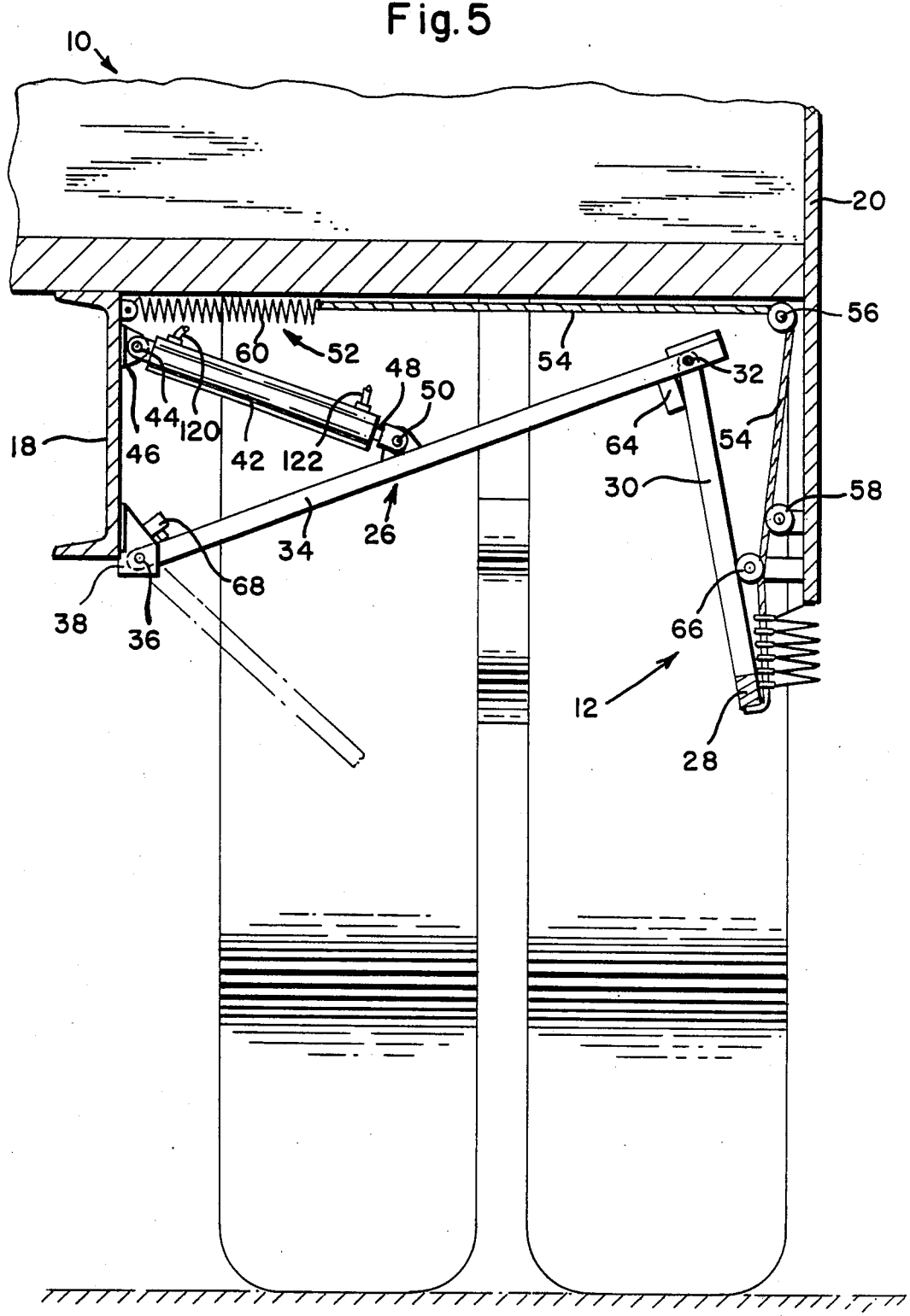
FIG. 5 is a view similar to FIG. 4, showing the guard in a retracted or inactive position.

The details of the left guard 12 are shown in greater detail in FIGS. 4 and 5. The details of the right hand guard 14 are not illustrated in the drawings. However, the guard 14 is identical to the guard 12 except that it is considerably shorter, due to the presence of the door 15 of the bus. The guard 12 includes a planar sheet of flexible material 24, such as heavy-duty sail cloth. The cloth has a plurality of horizontal pleats or fold lines. One edge of the sheet 24 is attached to the bottom edge 22 of the left side of the bus body 20. The opposite edge of the sheet 24 is attached to a horizontal bar 28 which forms part of connecting means 26. The bar 28 is attached to three pairs of connecting levers, one pair of connecting levers being located at the front of the guard, one at the back of the guard, and one in the middle. The middle pair of connecting levers is shown in FIGS. 4 and 5. Each pair of connecting levers comprises an outer lever 30 and an inner lever 34. The outer end of the outer lever 30 is connected to the horizontal bar 28 and the inner end of the outer lever 30 is pivotally connected to the inner lever 34 by means of a pivot pin 32 for pivoting about a horizontal axis. The inner end of the lever 34 is pivotally connected to a bracket 38 by means of a pivot pin 36 for pivoting about a horizontal axis. The bracket 38 is fixed to the frame 18 of the bus.

The guard 12 is moved between the active extended position shown in FIG. 4 to the withdrawn inactive position shown in FIG. 5 by drive means, generally indicated by the reference numeral 40. The drive means 40 includes a double acting cylinder 42 which is pivotally connected at one end to a bracket 46 by means of a pivot pin 44 for pivoting about a horizontal axis. The bracket 46 is fixed to the frame 18. One end of a piston rod 48 is attached to a piston which is slidably mounted within the cylinder 42. The opposite end of the piston rod 48 is pivotally connected to the inner lever 34 of the middle pair of connecting levers by means of a horizontal pivot pin 50. The guard 12 also includes guide means, generally indicated by the reference numeral 52, which comprises an elongated cord 54 which is trained around guide pulleys 56 and 58. One end of the cord 54 is fixed to the horizontal bar 28. The opposite end of the cord 54 is attached to a tension spring 60 which is fixed to the frame 18. The cord 54 extends freely through a plurality of rings or loops 62 which are fixed to the sheet 24. The horizontal pleats of the sheet 24 enable the sheet to be folded into a compact package as shown in FIG. 5. There is a pleat at each loop 62 and intermediate each loop 62, so that the length of each fold is half the distance between each loop 62. When the sheet 24 is in the lower or fully extended position as shown in FIG. 4, the spring 60 is fully extended so that the cord 54 is biased upwardly. When the guard is moved to the upper inactive position as shown in FIG. 5, the cord 54 is drawn upwardly by the spring 60 and guided about the pulleys 56 and 58. The function of the cord 54 is to guide the sheet 24 as the sheet 24 moves from the extended position shown in FIG. 4 to the compact position shown in FIG. 5 so that the sheet 24 is folded in a controlled and even manner along its pleats. When the cylinder 40 is actuated so that the piston rod 48 is fully extended, the inner and outer levers 34 and 30, respectively, are at their lowest position as shown in FIG. 4 and the guard 12 is in its fully extended position. When levers 34 and 30 are in their lowest position as shown in FIG. 4, they are axially aligned. The outer bar 30 is prevented from moving outwardly from this axial alignment by a bracket 65 which is fixed to the inner lever 34. When the cylinder 40 is actuated to withdraw the piston rod 48, the inner lever 34 is caused to swing upwardly about the pivot pin 36. This causes the outer lever 30 to swing inwardly about the pivot pin 32 out of axial alignment with the inner lever 34 while simultaneously moving upwardly and drawing the horizontal bar 28 upwardly. As the inner lever 34 continues to swing upwardly, the outer lever 30 engages a guide roll 66 which extends inwardly from the body of the bus. The roll 66 continues to guide the lever 30 until the levers 34 and 30 reach their uppermost position as shown in FIG. 5, at which point the outer lever 30 is at a considerable angle with respect to the inner lever 34. The inward motion of the outer lever 30 relative to the inner lever 34 is limited by means of a bracket 64 which is fixed to the inner lever 34. When the inner lever 34 reaches its uppermost position as shown in FIG. 5, it engages a double pole switch 68 which is mounted on the bracket 38 for a purpose to be described. A particular double acting hydraulic cylinder which has been used successfully with this invention is a model WFC 1504 which is marketed by Shuster of New Bedford, Massachusetts.

Figure 6:
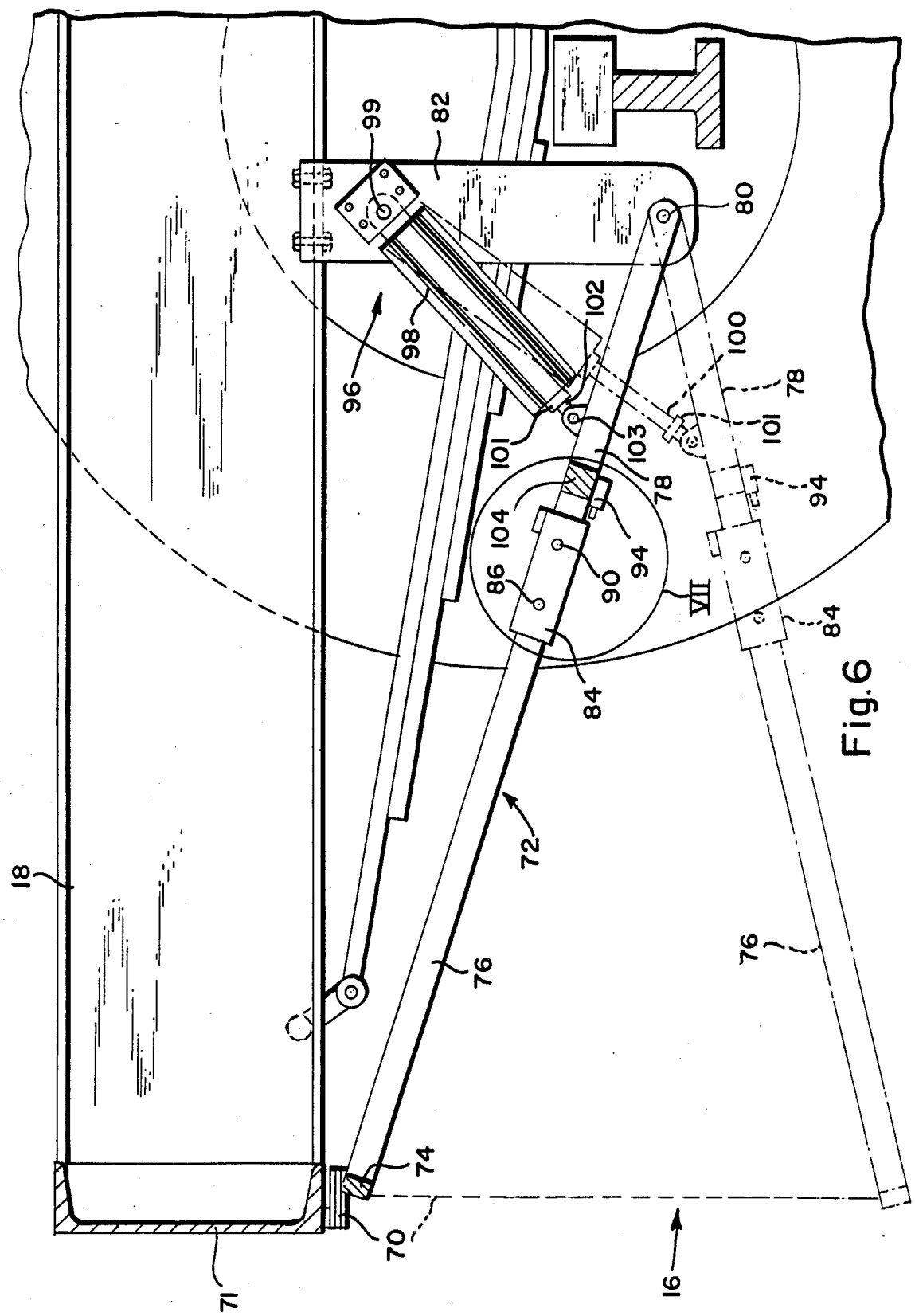
FIG. 6 is a vertical sectional view taken on the line VI—VI of FIG. 3, showing the guard which is associated with the front bumper of the bus.
Figure 7:
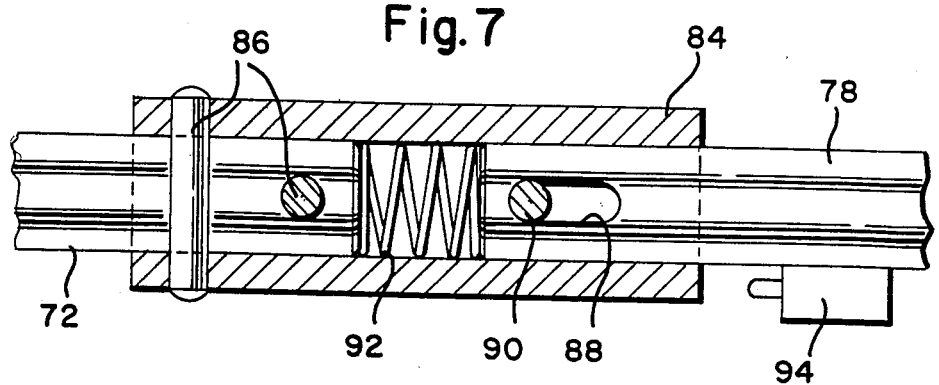
FIG. 7 is a fragmentary view of the connecting elements shown in the circle VII of FIG. 6 on an enlarged scale with portions broken away.
Figure 8:
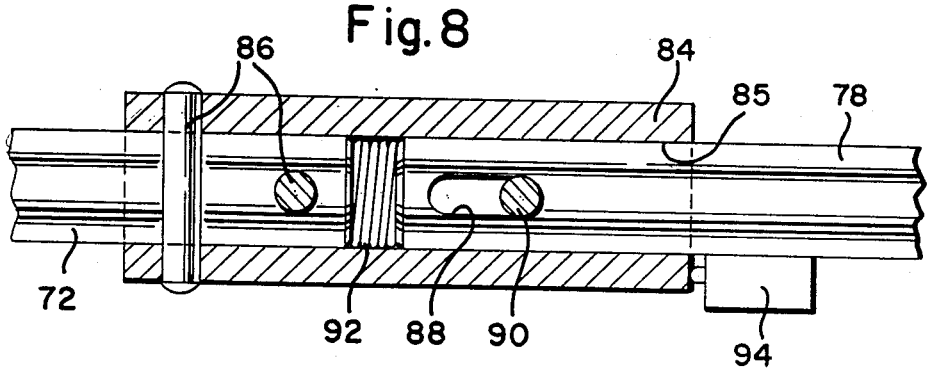
FIG. 8 is a view similar to FIG. 7, showing the elements of FIG. 7 in a different operational relationship.

Referring to FIG. 6, the front guard 16 comprises a sheet of flexible material such as heavy duty sail cloth which includes a plurality of horizontal fold lines or pleats. One edge of the sheet 70 is fixed to the bottom of the front bumper 71 of the bus. The opposite edge of the sheet 70 is fixed to a horizontal bar 74 which forms part of connecting means which is generally indicated by the reference numeral 72. The connecting means 72 also comprises two pairs of connecting levers. Each pair of connecting levers includes an outer lever 76 and an inner lever 78. The outer end of the outer lever 76 is fixed to the horizontal bar 74. The inner end of the inner lever 78 is pivotally connected to a vertical bracket 82 by means of a horizontal pivot pin 80. The bracket 82 is fixed to the frame 18 of the bus. The outer end of the inner lever 72 and the inner end of the outer lever 76 are operatively connected by means of a tubular connector 84 which maintains the levers 76 and 78 in axial alignment. Referring also to FIGS. 7 and 8, the tubular connector 84 includes an inner bore 85. The inner end of the outer lever 72 is located within the bore 85 and is fixed to the tubular connector 84 by means of a pair of connecting pins 86. The outer end of the inner lever 78 is slidably mounted within the bore 85 and includes a slot 88 which extends along the longitudinal axis of the lever 78. A pin 90 is fixed to the tubular connector 84 and extends into the bore 85 and through the slot 88 for limiting the axial movement of the lever 72 and tubular connector 84 relative to the lever 78. A spring 92 is located within the bore 85 between the adjacent ends of levers 72 and 78 for maintaining the levers 76 and 78 at their maximum separated condition as shown in FIG. 7. When sufficient inward force is applied against the outside surface of the sheet 70, the lever 72 and the tubular connector 84 are caused to move inwardly relative to the inner lever 78, thereby compressing the spring 92 until the pin 90 reaches the inner end of the slot 88. At this point, the tubular connector 84 actuates a limit switch 94 which is fixed to the inner lever 78. The switch 94 and a connecting mechanism for the levers 76 and 78 form part of a safety system to be described in greater detail.

The connecting means 72 is moved between an upper inactive position shown in full lines in FIG. 6 to a lower active position shown in dotted lines in FIG. 6 by drive means which is generally indicated by the reference numeral 96. The drive means 96 includes a double acting cylinder 98 which is similar to cylinder 42. One end of the cylinder 98 is pivotally connected to the bracket 82 by means of a horizontal pivot pin 99. One end of a connecting rod 100 is attached to a piston which is slidably mounted within the cylinder 98. The opposite end of the connecting rod 100 is pivotally connected to the lever 78 by means of a horizontal pivot pin 103. The length of the connecting rod 100 is made adjustable by means of an extension 102 which is telescopingly mounted within the main body of the connecting rod 100. A collar 101 is mounted on the rod 100 for rotation about the central longitudinal axis of the rod 100 and is threadingly engaged with the extension 102. Rotation of the collar 101 in one direction causes the extension 102 to move into the rod 100 and, rotation of the collar 101 in the opposite direction causes the extension 102 to move axially away from the rod 100. This feature provides a fine adjustment for the effective length of the connecting rod 100 which is helpful in installing the guard 16 on a school bus. The cylinder 98 is connected to one of the two sets of inner and outer levers as shown, for example, in FIG. 9. Both sets of inner and outer levers are connected by means of the horizontal bar 74 and a horizontal stabilizing bar 104.

Figure 9:
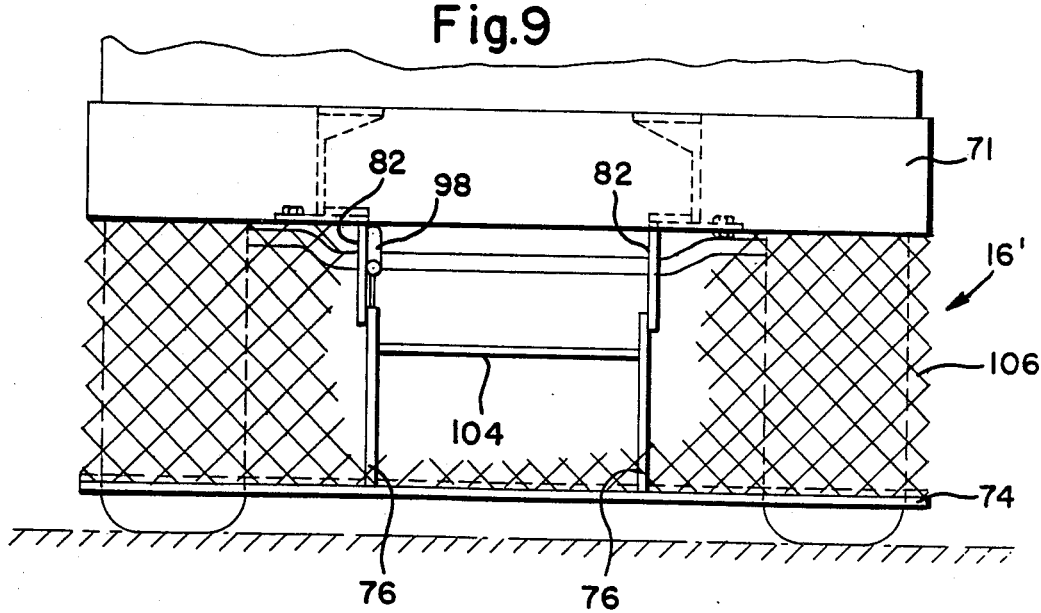
FIG. 9 is a front elevational view of the front guard, showing a modification.

Referring to FIG. 9 there is shown a modified front gate 16' which is identical to the gate 16 except that the sheet of flexible material which is attached to the bumper and the horizontal bar 74 consists of a chain-link fence 106. When the gate 16' is fully extended, as shown in FIG. 9, the chain-link fence 106 occupies a generally vertical flat plane. However, when the gate 16' is moved to the retracted position by moving the cross bar 74 to the point just beneath the front bumper 71, the chain-link fence 106 collapses into a tight roll.

Figure 10:
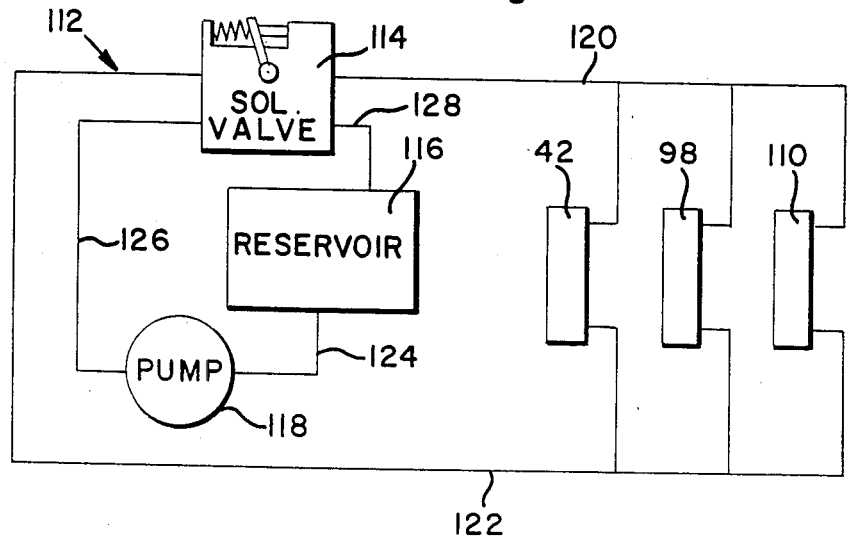
FIG. 10 is a schematic view of a hydraulic system which forms part of the drive means for the guard.

Referring to FIG. 10 there is shown a schematic diagram of the hydraulic system for actuating the gates 12, 14, and 16. The hydraulic system includes a hydraulic power pack which is generally indicated by the reference numeral 112 and which is operatively connected to double acting cylinders 42, 98 for gates 12 and 16, respectively, and also to a double acting hydraulic cylinder 110 which forms part of the drive means for the gate 14. The hydraulic power pack 112 includes three basic components. A tank or reservoir of hydraulic fluid 116, an electric pump 118, and a solenoid valve 114. The solenoid valve 114 is connected to the upper ends of the cylinders 42, 98, and 110 by means of a hydraulic line 120. Valve 114 is connected to the lower ends of the cylinders 42, 98, and 110 by means of a hydraulic line 122. The pump 118 is connected to the valve 114 by a hydraulic line 126 and to the tank or reservoir 116 by means of a hydraulic line 124. The tank or reservoir 116 is connected to the valve 114 by means of a hydraulic line 128. When the pump 118 is energized, it is effective to pump hydraulic fluid from the reservoir 116 to the valve 114. The valve 114 has two operating modes, an energized mode and an deenergized mode. When the solenoid portion of the valve 114 is energized, the valve 114 is brought to the energized mode, wherein it is effective to operatively connect the pump 118 through the hydraulic line 120. This causes hydraulic fluid under pressure to enter the upper portions of the cylinders 42, 98, and 110 and allows hydraulic fluid to flow from the lower portions of the cylinders through the hydraulic line 122, the solenoid valve 114, and the line 128 back to the reservoir 116. This also causes each of the cylinders 42, 98, and 110 to extend their respective connecting rods and bring their associated gates into the extended or active position. When the solenoid portion of the valve 114 is deenergized, the valve is brought to its deenergized state which effectively reverses the hydraulic system. Hydraulic fluid is pumped to the lower ends of the cylinders 42, 98, and 110 through the hydraulic line 122 and hydraulic fluid flows from the cylinders back to the reservoir 116 through the hydraulic line 120. A hydraulic power pack which has worked effectively as part of the present invention is a model M-641 of Monarch Road Machinery Co. of Grand Rapids, Mich.

Figure 11:
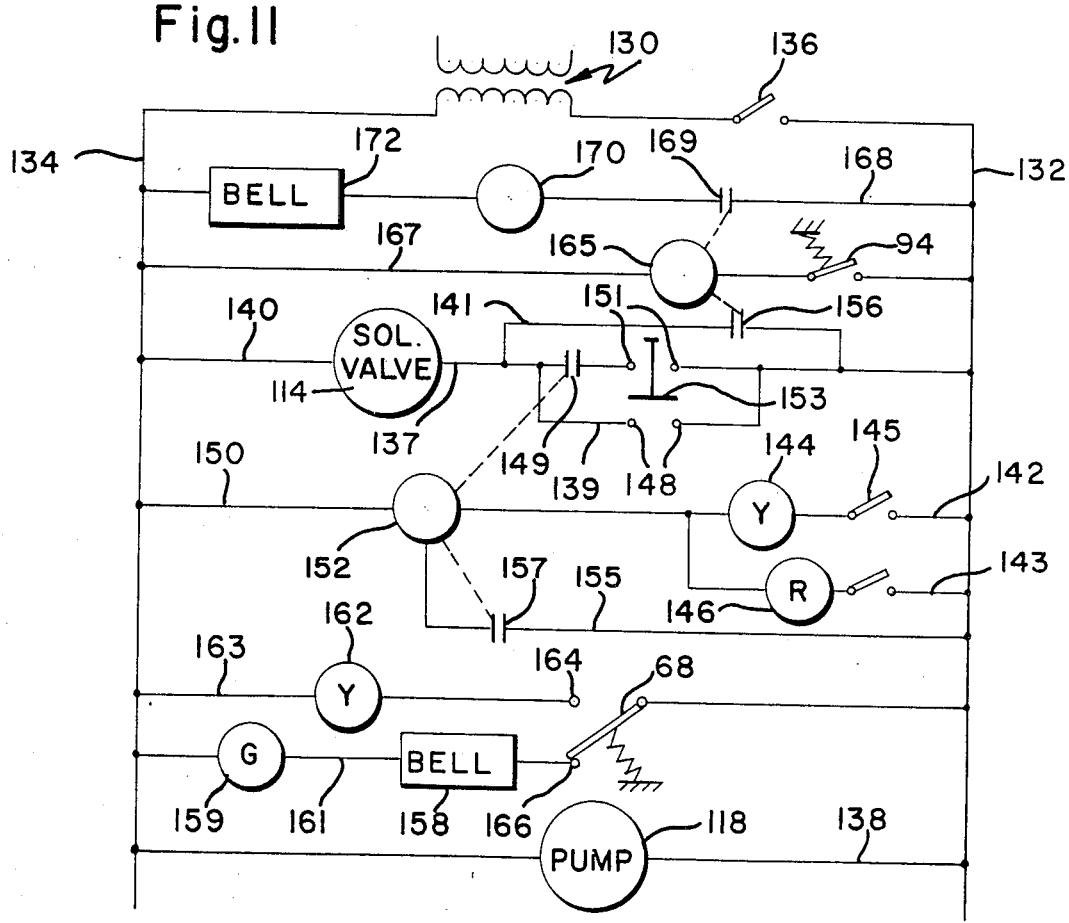
FIG. 11 is a schematic electrical diagram for controlling the hydraulic drive means.

Referring to FIG. 11, there is shown a schematic wiring diagram for the electrical control elements of the electrical drive means for operating the guards 12, 14, and 16. A pair of power lines 132 and 134 are operatively connected to a source of electrical power 130 which can be either the battery of the school bus or a separate battery for operating the guard system. The hydraulic pump 118 is located on a line 138 which is connected across the power lines 132 and 134. The entire electrical control system is normally deenergized and is energized by closing a main start switch 136 which connects the power line 132 to the source of electrical power 130. Upon closing of switch 136, the hydraulic pump 118 is energized which maintains all of the guards in the retracted or inactive state. The guards remain in this state while the school bus is in transit.

Solenoid valve 114 is connected to the power line 134 through a line 140 and is selectively operatively connected to the power line 132 through any of the lines 137, 139 or 141. Line 137 contains a normally open contact 149 and a pair of contact points 151 of a manually operated three position master switch 153. Line 139 contains a pair of contact points 148 of switch 153. Switch 153 can occupy an open or neutral position as shown in the drawings. Switch 153 can also occupy a first closed position in which contacts 151 are bridged or a second closed position in which contact points 148 are bridged When the bus is in transit, the switch 153 normally occupies the first closed position in which contact points 151 are bridged. The line 41 contains a normally open contact 156 of a relay 165 to be described.

A time delay relay 152 is connected to power line 34 through a line 150 and is selectively connected to the power line 132 through either a line 142 or a line 143. Line 142 contains a normally open switch 145 and the yellow light blinking system 144 of the school bus. Line 143 contains a switch 147 and the red light blinking systems 146 of the school. The time delay 152 is operatively connected to power line 132 through a line 155 which contains a normally open contact 157. When time delay relay 152 is energized through either of the lines 142 or 143, it is effective to close contact 149 on line 137 and contact 157 on line 155. When both lines 142 and 143 are open, the time delay relay 152 will be partially deenergized but will maintain contacts 149 and 157 closed for a predetermined time period. At the end of the predetermined time period, the time delay relay becomes completely deenergized so that contacts 149 and 157 open.

When the school bus approaches a stop for the purpose of taking on or discharging passengers, the school bus driver first closes the switch 145 which actuates the yellow light blinking system of the school bus and, simultaneously, energizes the time delay relay 152. This causes contacts 149 and 157 to close, thereby energizing the solenoid valve 114. Energization of the solenoid valve 114 causes hydraulic fluid to flow from the lower portions of the cylinders 42, 98, and 110 and forces hydraulic fluid into the upper portions of the cylinders for forcing their respective connecting rods to the extended position and causing the guards 12, 14, and 16 to be lowered to their extended or active positions. When the school bus comes to a complete stop, switch 145 is opened. However, switch 147 which controls the red light blinking system is closed to maintain the relay 152 and solenoid valve 114 energized.

An audio device such as a bell 158 and a green light 159 are located on a line 161. A yellow light 162 is located on a line 163. Lines 163 and 161 are connected to power line 134 and are selectively connected to power line 132 through the double pole switch 68. The blade of the switch 68 is normally biased against a contact 166 which connects the line 161 to the power line 132. When the blade of the switch 68 is moved against a contact 164, line 163 is connected to the power line 132. When the gates are in the upper retracted position, the blades of switch 68 is maintained against the contact 164 by the central inner lever 34 of the 9ate 12. Therefore, the yellow light 162 is energized when the gates are in their upper positions. When the gates are lowered, the blade of the switch 68 is allowed to return to its normal position against the contact 166. Therefore, the bell 158 and the green light 159 are energized to indicate that the guards are down. The switch 94 is located on a line 167 together with the previously described relay 165 which is energized when the switch 94 is closed. A warning light 170 and a buzzer 172 are located on a line 168 together with a contact 169. When the relay 165 is energized, its normally open contacts 169 and 156 on lines 168 and 141, respectively, are closed. Closing of the contact 156 ensures that the solenoid valve 114 remains energized even if the switch 153 is in the neutral or open position and the contact 149 is open. If a child slips in front of the bus as it begins to pull away from the bus stop, and is struck by the guard 16, the lever 76 will be pushed toward the lever 78, causing the switch 94 to close. Closing of the switch 94 causes the relay 165 to be energized and close contacts 156 and 169. This energizes the warning light 170 and the bell 172 which alerts the bus driver to stop the bus, thereby preventing the child from being injured. Since contact 156 is closed, solenoid 114 remains energized and the guards remain down. When the bus is once again in transit, the time delay relay 152 is deenergized after a predetermined time period. Contacts 149 and 157 open which causes the solenoid valve to become deenergized. When the solenoid valve 114 becomes deenergized, hydraulic fluid is pumped into the lower portions of the cylinders 42, 98, and 110 and flows from the upper portions of the cylinders, thereby causing all of the gates to be raised to their retracted or inactive positions. When the gate 12 returns to its retracted position as shown in FIG. 5, the inner lever 34 causes the blade of the switch 68 to engage the contact 164 and energize the yellow light 162 to indicate that the gates are up.

The switch 153 functions as a master switch in that it is effective to manually selectively energize or deenergize the solenoid valve 114, regardless of the condition of the time delay relay 152. The solenoid 114 is energized by moving the switch 153 to its second closed position in which contact points 148 are bridged. The solenoid 114 is deenergized by moving the switch 153 to its open position. This enables the bus driver to manually lower or raise the gates by operating the switch 153. However, closing of the safety switch 94 maintains the solenoid valve 114 energized and the gates down, regardless of the position of the switch 153.

It is obvious that minor changes may be made in the form and construction of the invention without departing from the material spirit thereof. It is not, however, desired to define the invention to the exact form herein shown and described, but it is desired to include all such as properly come within the scope claimed.

The invention having been thus described, what is claimed as new and desired to secure by Letters Patent is:

1. Guard for a school bus having a supporting frame and an outer body which includes a bottom outer peripheral edge which is substantially spaced from the ground, said guard comprising:
 (a) a sheet of flexible material which is adapted to be extended into an open planar state and to be reduced into a compact folded state, said sheet having a bottom edge and a top edge which is attached to the bottom outer peripheral edge of the school bus body,
 (b) connecting means having a first end which is operatively connected to the bottom edge of said sheet and a second end which is operatively connected to said frame for movement between a bottom extended position and a top with drawn position, said first end being positioned substantially below said peripheral edge to a point which is substantially near the ground when said connecting means is in said extended position so that said sheet is fully extended from said peripheral edge to said point and said sheet occupies a substantially vertical plane, said first end being positioned substantially near said peripheral edge when said connecting means is in said withdrawn position so that said sheet is in said compact folded state near said peripheral edge, said connecting means comprising:
 (1) a horizontal bar which is attached to the bottom edge of said sheet,
 (2) an inner lever having an outer end, and an inner end which is pivotally connected to said frame for pivoting about a horizontal axis,
 (3) an outer lever having an inner end which is pivotally connected to the outer end of said inner lever for pivoting about a horizontal axis and an outer end which is attached to said horizontal bar,
 (4) a first stop which is operatively connected to one of said levers for preventing the outer lever from pivoting upwardly relative to the inner lever beyond a point where the inner and outer levers are aligned along their respective longitudinal axes,
 (5) a second stop which is operatively connected to one of said levers for preventing the outer lever from pivoting downwardly relative to said inner lever beyond a predetermined angular position relative to the inner lever,
 (6) means for biasing the outer end of said outer lever upwardly relative to said inner lever so that said inner and outer levers are axially aligned when said connecting means are in said bottom extended position, and (7) guide means for forcing the outer end of said outer lever downwardly relative to said inner lever when said levers move upwardly from said lower extended position to said top withdrawn position, so that said outer lever assumes said predetermined angular position relative to the inner lever, and (c) drive means operatively connected to said connecting means for selectively moving said connecting means to said extended position and said withdrawn position.

2. Guard as recited in claim 1, wherein said biasing means comprises:

(a) a tension spring having one end fixed to a fixed part of the bus, and (b) a flexible line having a first end which is fixed to the opposite end of said spring, and a second end which is fixed to the outer end of said outer lever.

3. Guard as recited in claim 2, wherein said sheet has a plurality of horizontal fold lines and a plurality of loops which are fixed to said sheet at at least some of said fold lines, said flexible line extending freely through said loops so that said sheet is guided along said flexible line as the sheet folds and unfolds during movement of the connecting means between the extended and withdrawn positions of said connecting means.

4. Guard for a school bus having a supporting frame and an outer body which includes a bottom outer peripheral edge which is substantially spaced from the ground, said guard comprising:

(a) a sheet of flexible material which is adapted to be extended into an open planar state and to be reduced into a compact folded state, said sheet having a bottom edge and a top edge which is attached to the bottom outer peripheral edge of the school bus body, (b) connecting means having a first end which is operatively connected to the bottom edge of said sheet and a second end which is operatively connected to said frame for movement between a bottom extended position and a top withdrawn position, said first end being positioned substantially below said peripheral edge to a point which is substantially near the ground when said connecting means is in said extended position so that said sheet is fully extended from said peripheral edge to said point and said sheet occupies a substantially vertical plane, said first end being positioned substantially near said peripheral edge when said connecting means is in said withdrawn position so that said sheet is in said compact folded state near said peripheral edge, said connecting means comprising:

(1) a horizontal bar which is attached to the bottom edge of said sheet, (2) an inner lever which is operatively connected to said drive means, said inner lever having an outer end, and an inner end which is pivotally connected to said frame for enabling said inner lever to pivot about a horizontal axis between an upper position and a lower position, said inner lever being in said upper position when said connecting means is in the top withdrawn position, and said inner lever being in said lower position when said connecting means is in the bottom extended position, (3) an outer lever having an inner end which is pivotally connected to the outer end of said inner lever for enabling said outer lever to pivot about a horizontal axis relative to said inner lever, and an outer end which is attached to said horizontal bar, and (4) mechanical control and guide means for causing said outer lever to be fully extended relative to said inner lever when said inner lever is in said lower position, and for causing said outer lever to be at least partially folded relative to said inner lever when said inner lever is in said upper position, and (c) drive means operatively connected to said connection means for selectively moving said connecting means to said extended position and to said withdrawn position.

5. Guard for a school bus having a supporting frame and an outer body which includes a bottom outer peripheral edge which is substantially spaced from the ground, said guard comprising:

(a) a sheet of flexible material which is adapted to be extended into an open planar state and to be reduced into a compact folded state, said sheet having a bottom edge and a top edge which is attached to the bottom outer peripheral edge of the school bus body, (b) connecting means having a first end which is operatively connected to the bottom edge of said sheet and a second end which is operatively connected to said frame for movement between a bottom extended position and a top withdrawn position, said first end being positioned substantially below said peripheral edge to a point which is substantially near the ground when said connecting means is in said extended position so that said sheet is fully extended from said peripheral edge to said point and said sheet occupies a substantially vertical plane, said first end being positioned substantially near said peripheral edge when said connecting means is in said withdrawn position so that said sheet is in said compact folded state near said peripheral edge, said connecting means comprising:

(1) a horizontal bar which is attached to the bottom edge of said sheet, (2) an inner lever which is operatively connected to said drive means, said inner lever having an outer end, and an inner end which is pivotally connected to said frame for enabling said inner lever to pivot about a horizontal axis between an upper position and a lower position, said inner lever being in said upper position when said connecting means is in the top withdrawn position, and said inner lever being in said lower position when said connecting means is in the bottom extended position, (3) a tubular connector which is fixed to the outer end of said inner lever, (4) an outer lever having an outer end which is attached to said horizontal bar and an inner end which is mounted within said tubular connector for sliding axial motion toward and away from the outer end of said inner lever along the central longitudinal axis of said inner lever, (5) biasing means for maintaining the outer end of said inner lever and the inner end of said outer lever spaced along said longitudinal axis, (6) a stop for limiting the separation of said inner and outer levers by said biasing means, (7) an electrically actuated sensory indicator, and (8) electrical sensing means for actuating said sensory indicator when the inner end of said outer lever is moved toward the outer end of said inner lever, and (c) drive means operatively connected to said connecting means for selectively moving said connecting means to said extended position and said withdrawn position.

6. Guard for a school bus having a supporting frame and an outer body which includes a bottom outer peripheral edge which is substantially spaced from the ground, said guard comprising:
(a) a sheet of flexible material which is adapted to be extended into an open planar state and to be reduced into a compact folded state, said sheet having a bottom edge and a top edge which is attached to the bottom outer peripheral edge of the school bus body,
(b) connecting means having a first end which is operatively connected to the bottom edge of said sheet and a second end which is operatively connected to said frame for movement between a bottom extended position and a top withdrawn position, said first end being positioned substantially below said peripheral edge to a point which is substantially near the ground when said connecting means is in said extended position so that said sheet is fully extended from said peripheral edge to said point and said sheet occupies a substantially vertical plane, said first end being positioned substantially near said peripheral edge when said connecting means is in said withdrawn position so that said sheet is in said compact folded state near said peripheral edge, said connecting means comprising:
(c) drive means operatively connected to said connecting means for selectively moving said connecting means to said extended position and said withdrawn position, said drive means comprising:
(1) a double acting fluid actuator which is operatively connected to said frame and to said lever,
(2) an electrically controlled fluid system which is operatively connected to said fluid actuator, and
(3) electrical control means for controlling said fluid system, said electrical control means comprising manual control means for selectively moving said connecting means to said extended position and to said withdrawn position, and automatic control means which is operatively to said electrical sensing means for overriding said manual control means and maintaining said connecting means in said extended position when the inner end of said outer lever is moved toward the outer end of said inner lever.

* * * * *